United States Patent
Reimers et al.

(10) Patent No.: US 11,231,848 B2
(45) Date of Patent: Jan. 25, 2022

(54) NON-POSITIVE INDEX VALUES OF PANEL INPUT SOURCES

(71) Applicant: Hewlett-Packard Development Company, L.P., Houston, TX (US)

(72) Inventors: Nathan Thomas Reimers, Boise, ID (US); Michael J. Alff, Boise, ID (US); Samuel Yuichi Ogami, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 388 days.

(21) Appl. No.: 16/021,335

(22) Filed: Jun. 28, 2018

(65) Prior Publication Data

US 2020/0004398 A1 Jan. 2, 2020

(51) Int. Cl.
*G06F 3/0488* (2013.01)
*G06F 3/16* (2006.01)
*G06F 3/0482* (2013.01)

(52) U.S. Cl.
CPC .......... *G06F 3/0488* (2013.01); *G06F 3/0482* (2013.01); *G06F 3/167* (2013.01)

(58) Field of Classification Search
CPC ........ G06K 9/3233; G06K 9/30; G06F 17/18; G06F 17/30; G06F 3/0481; G06F 3/0484; G06F 3/0488; G06F 3/167; G06F 3/0482; G10L 13/18; G02F 1/134; G09B 21/006; G06G 3/16; G06G 3/167
See application file for complete search history.

(56) References Cited

U.S. PATENT DOCUMENTS

| | | | | |
|---|---|---|---|---|
| 6,983,371 | B1* | 1/2006 | Hurtado | G06F 21/10 380/255 |
| 7,286,256 | B2* | 10/2007 | Herbert | H04N 1/00132 358/1.15 |
| 8,340,726 | B1* | 12/2012 | Fujisaki | G06F 3/0482 455/566 |
| 8,744,852 | B1 | 6/2014 | Seymour et al. | |
| 8,826,137 | B2 | 9/2014 | Hofstader et al. | |

(Continued)

FOREIGN PATENT DOCUMENTS

EP 2945052 A1 * 11/2015 ............. G10L 13/00

OTHER PUBLICATIONS

Oracle® Hyperion Enterprise Performance Management Workspace, 2012, Oracle.

*Primary Examiner* — Steven P Sax
(74) *Attorney, Agent, or Firm* — Brooks Cameron & Huebsch PLLP (57) ABSTRACT

Example implementations relate to a computing system with a memory resource, a processing resource, and associated with a screen reader providing an audio presentation based on assigning non-positive index values to input sources. In some examples, a first index value is assigned to a first input source of a first panel of a graphical user interface (GUI). Responsive to an action event being received corresponding to the first input source, a second panel is generated. Responsive to the second panel being generated, a second input source of the second panel is generated. A second index value is assigned to the first input source when the second panel is generated, the first index value being not equal to the second index value, and the second index value being a non-positive value.

14 Claims, 7 Drawing Sheets

(56) References Cited

U.S. PATENT DOCUMENTS

| | | | | |
|---|---|---|---|---|
| 9,524,751 B2* | 12/2016 | Oz | ................... | H04N 9/8205 |
| 9,906,399 B2* | 2/2018 | Venkatramanan | ...... | H04L 41/20 |
| 10,616,726 B1* | 4/2020 | Freeman, II | .......... | H04W 4/025 |
| 2002/0143885 A1* | 10/2002 | Ross, Jr. | ................. | H04L 51/00 |
| | | | | 709/207 |
| 2004/0070612 A1 | 4/2004 | Sinclair et al. | | |
| 2004/0078751 A1* | 4/2004 | Kadoi | ................... | G06F 3/1204 |
| | | | | 715/255 |
| 2004/0125128 A1* | 7/2004 | Chang | ................... | G06F 3/0486 |
| | | | | 715/730 |
| 2004/0145607 A1* | 7/2004 | Alderson | ................ | G06F 9/451 |
| | | | | 715/746 |
| 2006/0074895 A1* | 4/2006 | Belknap | ................ | G06F 16/685 |
| 2006/0150075 A1 | 7/2006 | Dietl et al. | | |
| 2006/0286538 A1* | 12/2006 | Scalone | ................... | G09B 7/00 |
| | | | | 434/350 |
| 2008/0288864 A1* | 11/2008 | Qu | ...................... | G06F 16/4393 |
| | | | | 715/273 |
| 2009/0009143 A1 | 4/2009 | Ryan et al. | | |
| 2010/0211875 A1* | 8/2010 | Matsushita | ............. | G06F 3/167 |
| | | | | 715/716 |
| 2010/0257456 A1* | 10/2010 | Lieb | ........................ | H04L 67/02 |
| | | | | 715/741 |
| 2011/0007901 A1* | 1/2011 | Ikeda | ................. | H04N 1/00291 |
| | | | | 380/270 |
| 2011/0154212 A1* | 6/2011 | Gharpure | ............. | G09B 21/009 |
| | | | | 715/738 |
| 2012/0092318 A1* | 4/2012 | Mishra | .................. | G06F 3/1446 |
| | | | | 345/211 |
| 2012/0178060 A1* | 7/2012 | Gitt | ........................ | G09B 17/00 |
| | | | | 434/178 |
| 2012/0250072 A1* | 10/2012 | Miller | ................... | G06F 3/1257 |
| | | | | 358/1.15 |
| 2013/0332815 A1 | 12/2013 | Gallo et al. | | |
| 2014/0118314 A1* | 5/2014 | Black | ....................... | G06F 3/16 |
| | | | | 345/179 |
| 2015/0142444 A1* | 5/2015 | Boss | ....................... | G10L 13/00 |
| | | | | 704/260 |
| 2015/0244768 A1* | 8/2015 | Boss | ..................... | G06F 16/958 |
| | | | | 709/217 |
| 2016/0092147 A1* | 3/2016 | Nakamura | ........... | G06F 3/1219 |
| | | | | 358/1.6 |
| 2017/0046115 A1* | 2/2017 | Rahardjo | ................ | G06F 3/165 |
| 2017/0083196 A1* | 3/2017 | Hartrell | ................ | G06N 3/0454 |
| 2017/0090855 A1* | 3/2017 | Cheng | ...................... | G06F 3/16 |
| 2018/0018470 A1* | 1/2018 | Aggarwal | ........... | G06F 3/04817 |
| 2018/0081602 A1* | 3/2018 | Ueda | ...................... | G06F 3/125 |

* cited by examiner

NON-POSITIVE INDEX VALUES OF PANEL INPUT SOURCES

BACKGROUND

A computing system can be associated with a graphical user interface that provides a panel that includes an input source for a receipt of an action event described by data presented on an input source. The computing system can further be associated with a speech reader that provides an audio presentation of data describing the input sources.

DETAILED DESCRIPTION

A computing system can be associated with a speech reader that provides audio presentations describing data presented on input sources on a graphical user interface (GUI) also associated with the computing system. Confusion can occur when the speech reader provides audio presentations describing data that is irrelevant relative to the purpose the computing system is being used. For example, a speech reader providing an audio presentation concerning color printing can be confusing after a selection of an input source related to black and white printing has already been selected. As such, the current disclosure puts forth a system, a method, and a non-transitory machine readable medium for a speech reader to provide audio presentations that are not confusing.

A computing system can be any of a number of different computing systems. As used herein, the computing system can be a mobile computing system, a printing device computing system, a desktop computing system, a portable computing system, and other types of computing systems. As used herein, a computing system can be associated with a GUI. A GUI is a type of user interface that allows users to interact with electronic devices through graphical icons and visual indicators such as input sources. Interactions that the GUI allows can be actions or occurrences recognized by the computing system, often originating asynchronously from the external environment, that may then be handled by the computing system. The computing system can, however, disable receipt of and thus ignore an interaction if programmed to do so by instructions stored in a memory resource of the computing system. Interactions are referred to herein as "action events". Concerning the receipt of events, an event can be a mouse event, a touch event, an audio event, or another event that creates an interaction with the computing system.

An input source allows interaction with the computing system through the GUI. Each input source is assigned an index value, where an index value signals whether an input source is focusable and/or selectable. For example, for computing systems that utilize keyboards, a tab index value is a value that signals whether an input source can be reached by pressing the "Tab" button on a keyboard or other peripheral device associated with the computing system.

As for the value itself, if an assigned value is negative, the computing system can prevent the input source from being focused on and/or selected. If the value is positive, the computing system allows the input source to be focused on and/or selected. If the value assigned to the input source comprises a zero, the order in which that input source is focused on can be either before or after input sources assigned a positive value. For example, if an input source is assigned a positive value of 1, a different input source can be assigned a positive value of 2, and another input source can be assigned a value comprising a zero, regardless of location relative to each other on the GUI, the input source assigned the value comprising the zero can constantly be the last (or first, based on programming) to be focused upon. In addition, an input source assigned a value comprising a zero can be ignored or received, if programmed to do so by instructions stored in a memory resource of the computing system.

A speech reader can provide audio presentations in a manner alternative to, or in addition to, visual presentations. The speech reader can follow the order of index values assigned to input sources. For example, the GUI may comprise two panels, with an input source on each panel. An index value assigned to a first input source on a first panel may be negative, whereas an index value assigned to a second input source on a second panel may be positive. The speech reader can follow the order of assigned index values and disregard the input source assigned the negative value. The speech reader can provide an audio presentation of data describing the second input source, since the second input source is assigned the positive value. If, for example, a third input source assigned an index value comprising a zero was added to the second panel, the speech reader can provide an audio presentation describing data presented on the third input source after the speech reader has made the audio presentation corresponding to the second input source, regardless of the location on the panel of the second and third input sources.

Figure 1:
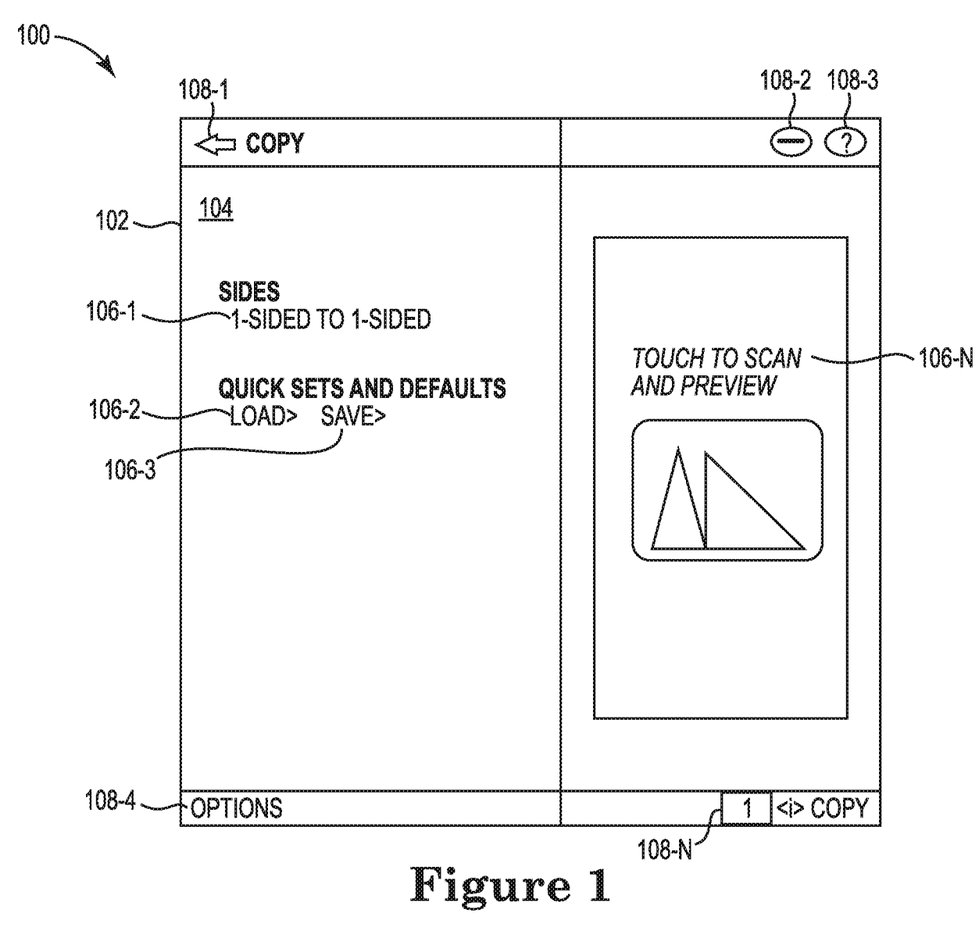
FIG. 1 illustrates a diagram of an example of a computing system including a graphical user interface having a plurality of input sources and a plurality of header input sources on a panel consistent with the disclosure.

FIG. 1 illustrates a diagram of an example of a computing system 100 including a GUI 102 displaying a first plurality of input sources 106-1, 106-2, 106-3 . . . 106-N and a plurality of header input sources 108-1, 108-2, 108-30, 108-4, 108-5 . . . 108-N on a first panel 104 consistent with the disclosure. As used herein, a computing system 100 can include a computing device connected to a memory resource, a processing resource, and a variety of peripheral devices. As used herein, "the plurality of header input sources" refers to input sources exterior to a panel of the GUI, for example to input sources in a header and/or a footer and/or a side outside of the panel of the GUI.

The GUI 102 included in the computing system 100 can include a first panel 104. A first plurality of input sources 106-1 . . . 106-N can be presented on the first panel 104 of the GUI 102. A plurality of header and footer input sources 108-1 . . . 108-N can be provided through the GUI 102. The input sources 106-1 . . . 106-N and 108-1 . . . 108-N can receive action events that trigger the performance of tasks by the computing system 100. An action event can be followed by at least one of a selection event and a focus event. The selection event can comprise at least one of a mouse selection event, a touch selection event, and/or an audio selection event. The selection event is generated based on a user's interaction with a hardware component such as a touch screen and/or a microphone that received audio commands for users. For example, a touch selection event of the input source 106-1 can cause a second panel to be generated. The second panel can comprise additional objects associated with the input source 106-1. Alternatively, an input source of the plurality of the input sources 108-1 . . . 108-N can be selected by a touch selection event. For example, upon receiving a selection event from the input source 108-1, the GUI 102 performs a task associated with input source 108-1. For example, the task to be performed can be to return to a panel that was previously focusable.

The focus event can comprise at least one of a mouse focus event, a touch focus event, and an audio focus event. The focus event can be generated responsive to receiving an input from a user that narrows focus onto an input source. The focus event can be used to shift the focus from an input source to a new input source that received the focus. For example, a mouse pointer could be moved from one of the first plurality of input sources 106-1 . . . 106-N to an input source 108-1 . . . 108-N, thereby shifting focus from the prior to the latter. Alternatively, a "Tab" button could be pressed on a keyboard associated with the computing device, thereby causing focus to shift from one input source to another. This may happen due to the input sources 106-1 . . . 106-N and 108-1 . . . 108-N having a "positive index value", thereby signifying that the input sources 106-1 . . . 106-N and 108-1 . . . 108-N currently are eligible to have focus shifted to them. Input sources can receive selection events and focus events if they have certain index values. Input sources assigned a positive index value are the input sources that can have focus shifted to and be selected.

For example, because each of the input sources 106-1 . . . 106-N and 108-1 . . . 108-N is assigned a positive index value, a speech reader associated with the computing device 100 can be in the midst of providing an audio presentation of the input sources 106-1 . . . 106-N when the computing system 100 receives a focus event switching focus to the input sources 108-1 . . . 108-N. Upon receipt of the focus event, the speech reader ceases providing the presentation of the input source 106-1 . . . 106-N and instead provides an audio presentation of the input source 108-1 . . . 108-N that was selected. For example, a speech reader can be providing an audio presentation of the input source 106-2 when the computing system 100 receives a focus event corresponding to a header input source 108-4. Upon receipt of this focus event, the speech reader can cease providing the audio presentation corresponding to the input source 106-2 and instead begin providing an audio presentation of the input source 108-4. A selection event can occur where focus has been switched to. For example, after focus has shifted to the input source 108-4, upon receipt of a selection event, the input source 108-4 can be what is selected due to the fact that that is where focus was switched to and remains.

Figure 2:
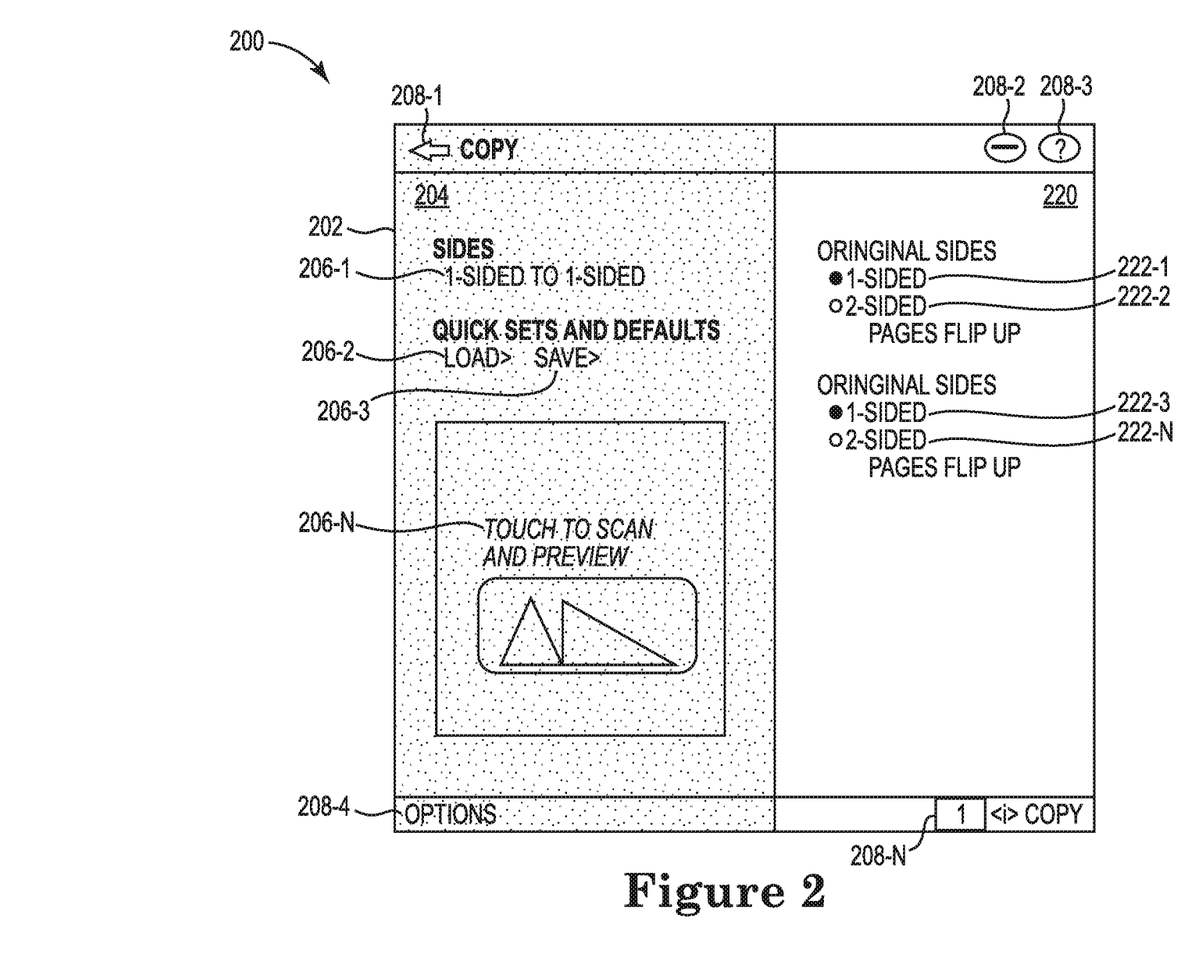
FIG. 2 illustrates a diagram of an example of a computing system including a graphical user interface having a first plurality of input sources on a first panel, a second plurality of input sources on a second panel, and a plurality of header input sources consistent with the disclosure.

FIG. 2 illustrates a diagram of an example of a computing system 200 including a GUI 202 displaying a first plurality of input sources 206-1, 206-2, 206-3 . . . 206-N on a first panel 204, a second plurality of input sources 222-1, 222-2, 222-3 . . . 222-N on a second panel 220, and a plurality of header input sources 208-1, 208-2, 208-3, 208-4 . . . 208-N consistent with the disclosure. FIG. 2 relates to FIG. 1 as an example of what follows an action event on one of the first plurality of input sources 106-1 . . . 106-N on the first panel 104.

As shown in FIG. 2, a background of the first panel 204, including the first plurality of input sources 206-1 . . . 206-N and certain header input sources 208-1 and 208-4, is different in an amount of stipple than a background of the second panel 220, including the second plurality of input sources 222-1 . . . 222-N and other header input sources 208-2, 208-3, 208-N. For example, a first amount of stipple assigned to the background of the first panel is intended to signify an index value that ignores at least one action event corresponding to at least one input source included in the first panel. For example, a second amount of stipple assigned to the background of the second panel is intended to signify an index value that performs at least one action resulting from at least one received action event corresponding to at least one input source included in the second panel. Input sources that disable receipt of action events are assigned a negative index value, whereas input sources that perform received action events are assigned a positive index value. Backgrounds of panels differing in an amount of stipple could be replaced by backgrounds of panels differing in color schemes, or other such features that allow for distinguishing between panels.

In other words, in the example of FIG. 2, the second panel 220 is modal in that, upon generation, the second panel 220 becomes the exclusive panel that can receive action events. The receipt of action events subsequent to the generation of the second panel input sources 222-1, . . . , 222-N can be limited to the header input sources 208-2, 208-3 . . . 208-N, and the plurality of second panel input sources 222-1 . . . 222-N. This further means that a receipt of an action event corresponding to the first plurality of input sources 206-1 . . . 206-N and/or the certain header input sources 208-1 and 208-4 is disabled after the generation of the second panel 220. Once a panel becomes modal, action events corresponding to input sources in other panels can be ignored. As such, once the second panel 220 is generated, the options available for input are described by the other input sources 208-2, 208-3 . . . 208-N, and the second plurality of second panel input sources 222-1 . . . 222-N.

This is why a speech reader associated with the computing system 200 can be limited to provide audio presentations of data describing the second plurality of input sources 222-1 . . . 222-N and the input sources 208-2, 208-3, and 208-N.

Figure 3:
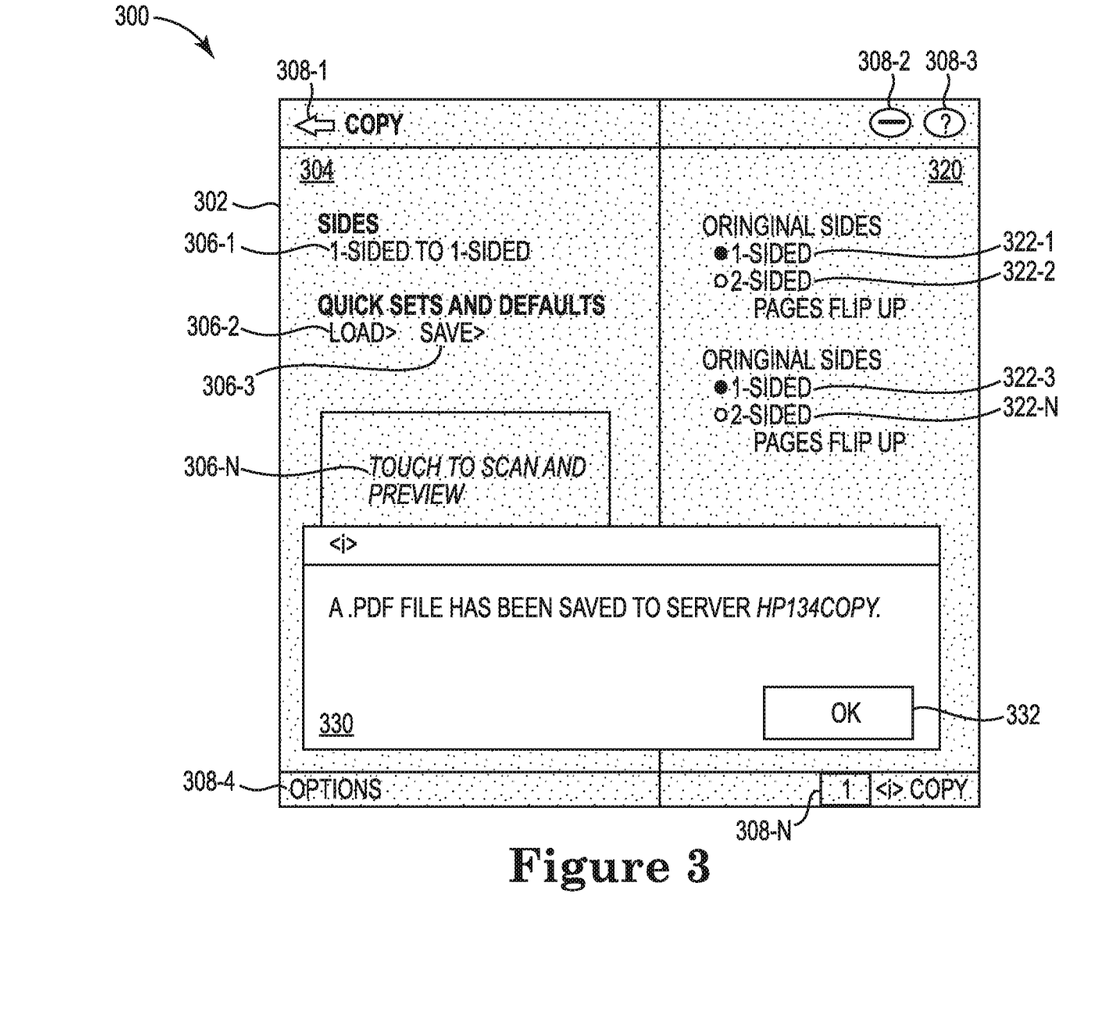
FIG. 3 illustrates a diagram of an example of a computing system including a graphical user interface having a first plurality of input sources on a first panel, a second plurality of input sources on a second panel, a single input source on a third panel, and a plurality of header input sources, as is consistent with the disclosure.

FIG. 3 illustrates a diagram of an example of a computing system 300 including a GUI 302 displaying a first plurality of input sources 306-1, 306-2, 306-3 . . . 306-N on a first panel 304, a second plurality of input sources 322-1, 322-2, 322-3 . . . 322-N on a second panel 320, a single input source 332 on a third panel 330, and a plurality of header input sources 308-1, 308-2, 308-3, 308-4 . . . 308-N, as is consistent with the disclosure. As shown in FIG. 3, the first panel 304, the second panel 320, and the plurality of header input sources 308-1 . . . 308-N have a first amount of stipple background. As such, in the example of FIG. 3, an amount of stipple signifies that items with the first amount of stipple background have been assigned an index value that disables receipt of action events.

The reason that action events are disabled for the items with the first amount of stipple background is due in part to the presence of the third panel 330, which comprises a dialog box including a single input source 332. A dialog box can be generated upon selection of an input source. For the third panel 330 to be generated, as in the example of FIG. 3, an input source is selected. The selection of the input source can result in a creation of a .pdf copy of a document and the storage of the .pdf copy in a specific server. To confirm the creation and storage, a dialog box can be generated and prioritized above other panels. The single input source 332 in the dialog box of the third panel 330 is the item of the GUI that is capable of receiving an action event. As such, until the single input source 332 button that reads "Ok" is acted upon, the dialog box remains on the third panel 330 and disallows other activity. This is why a speech reader associated with the computing system 300 provides an audio presentation of a description of the single input source 332 of the third panel 330.

Figure 4:
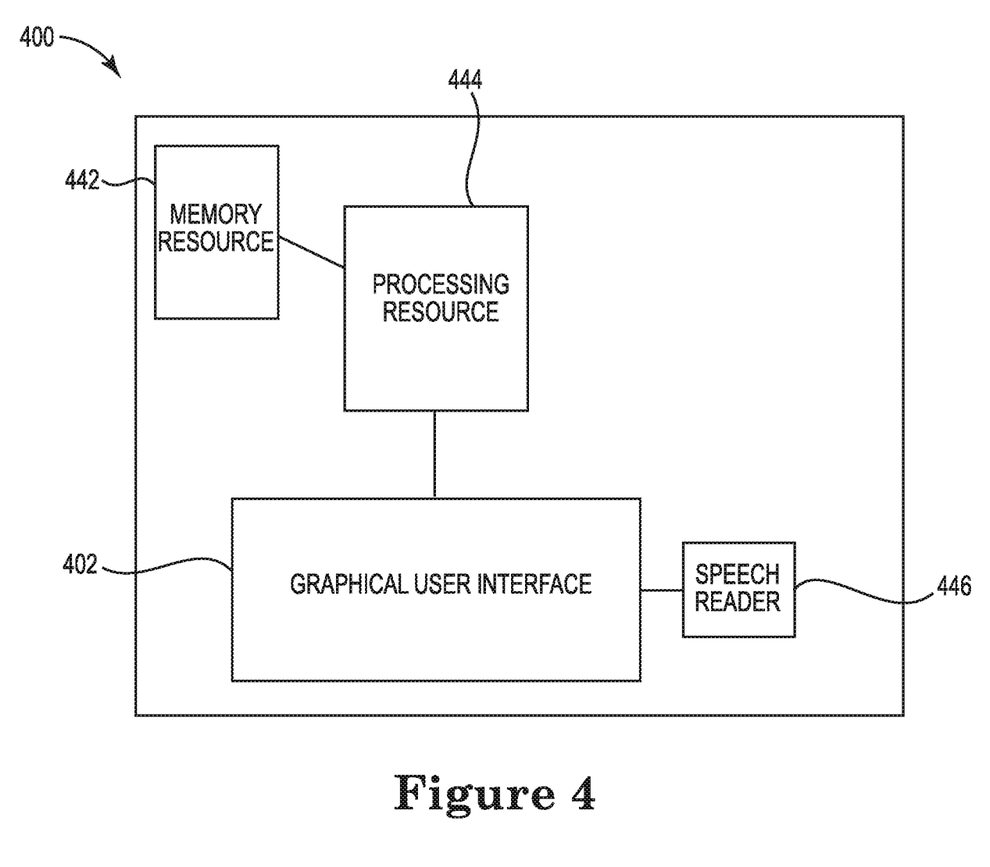
FIG. 4 illustrates a diagram of an example of a computing system for providing an audio presentation consistent with the disclosure.

FIG. 4 illustrates a diagram of an example of a computing system 400 for providing an audio presentation consistent with the disclosure. The computing system 400 can comprise a memory resource 442 and a processing resource 444 to provide power to peripheral devices, such as a GUI 402 and a speech reader 446.

The processing resource 444 can execute instructions to assign a first index value to a first input source (can be one of 106-1 . . . 106-N, 206-1 . . . 206-N, and 306-1 . . . 306-N from FIGS. 1, 2, and 3 respectively) of a first panel (shown as 104, 204, and 304 respectively) of the GUI. The processing resource 444 can receive an action event corresponding to the first input source. After receiving the action event, the processing resource 444 can further receive at least one of a selection event and a focus event. The selection event can comprise at least one of a mouse selection event, a touch selection event, and an audio selection event. The focus event can comprise at least one of a mouse focus event, a touch focus event, and an audio focus event.

Responsive to receiving the action event, the processing resource 444 can execute instructions to generate a second panel (shown as 220 and 320 in FIGS. 2 and 3 respectively) of the GUI. Responsive to generation of the second panel, the processing resource 444 can further execute instructions to generate a second input source (can be one of 222-1 . . . 222-N, 322-1 . . . 322-N, from FIGS. 2 and 3 respectively) of the second panel of the GUI 402. The processing resource 444 can execute instructions to assign a second index value to the first input source responsive to generating the second panel, wherein the first index value is not equal to the second index value and the second index value is a non-positive value.

The non-positive value can be a value comprising a zero or can be negative. When the second index value is a negative value, the processing resource 444 can prevent the screen reader 446 associated with the computing system 400 from providing an audio presentation of data describing the first input source that has been assigned the second index value. Furthermore, the processing resource 444 can disable a subsequent action event corresponding to the first input source responsive to the first input source being assigned the second index value.

The second input source of the second panel, on the other hand, is assigned the first index value, which can be a positive index value. The assigning of the first (positive) index value can result in the processing resource, responsive to traversing the first index value, providing, via the speech reader 446 associated with the computing system 400, an audio presentation of data describing the second input source assigned the first index value.

Figure 5:
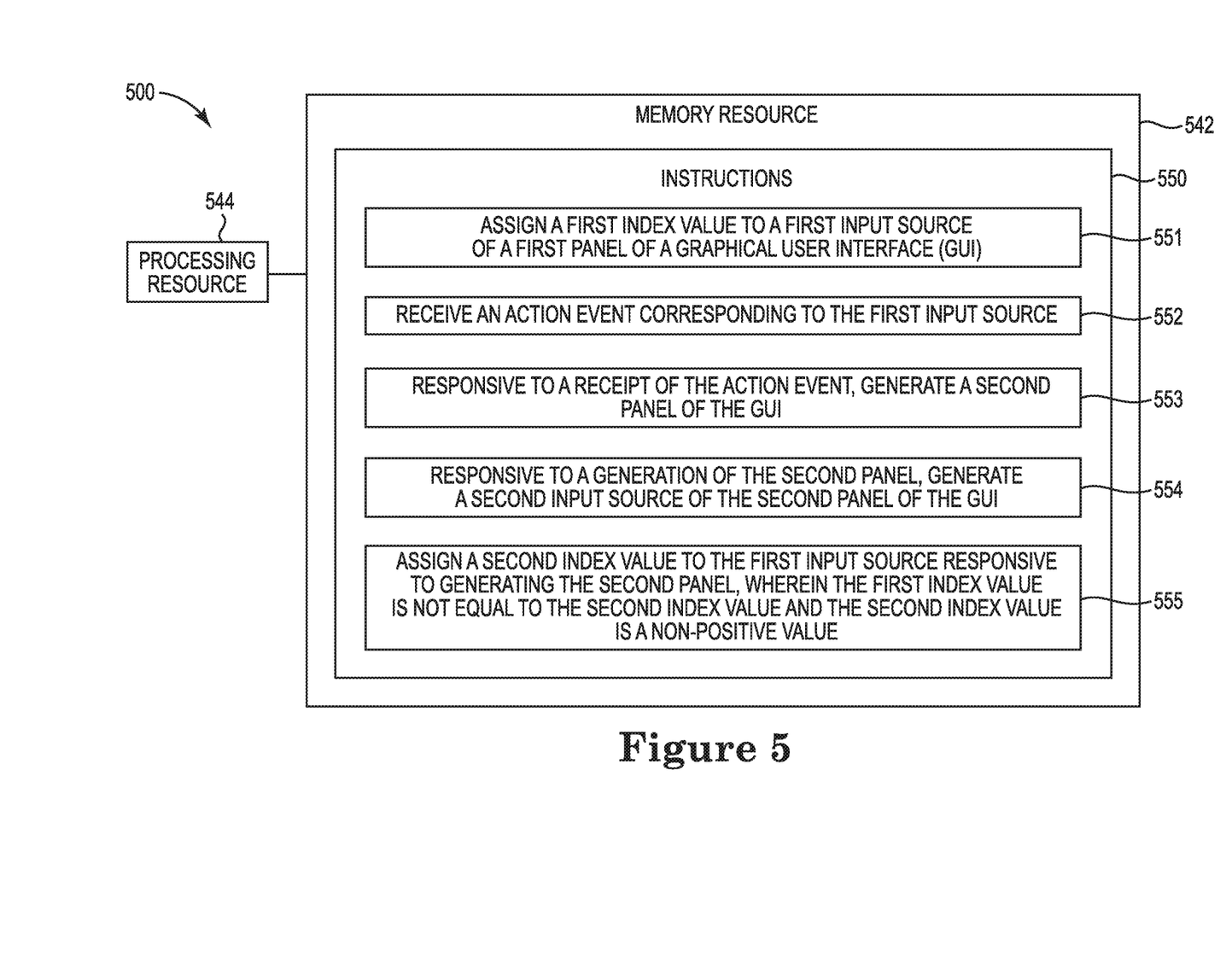
FIG. 5 illustrates an example flow diagram of a computing system to provide an audio presentation consistent with the disclosure.

FIG. 5 illustrates an example flow diagram of a computing system 500 to provide an audio presentation consistent with the disclosure. As shown in FIG. 5, the computing system 500 includes a processing resource 544 and a memory resource 542.

The processing resource 544 may be a hardware processing unit such as a microprocessor, application specific instruction set processor, coprocessor, network processor, or similar hardware circuitry that can cause machine-readable instructions to be executed. In some examples, the processing resource 544 may be a plurality of hardware processing units that can cause machine-readable instructions to be executed. The processing resource 544 can include central processing units (CPUs) and/or graphics processing units (GPUs), among other types of processing units. The memory resource 542 may be any type of volatile or non-volatile memory or storage, such as random access memory (RAM), flash memory, read-only memory (ROM), storage volumes, a hard disk, or a combination thereof.

The memory resource 542 may store instructions 550 thereon. When executed by the processing resource 544, the instructions 550 may cause the computing system 500 to perform specific tasks and/or functions. For example, at block 551, the memory resource 542 may store instructions 550 which may be executed by the processing resource 544 to assign a first index value to a first input source of a first panel of a GUI. At block 552, the memory resource 542 may store instructions 550 which may be executed by the processing resource 544 to receive an action event corresponding to the first input source. In some examples, the memory source 542 may store instructions 550 which may be executed by the processing source 544 to receive at least one of a selection event and a focus event. The selection event can comprise at least one of a mouse selection event, a touch selection event, and an audio selection event. The focus event can comprise at least one of a mouse focus event, a touch focus event, and an audio focus event.

At block 553, the memory resource 542 may store instructions 550 which may be executed by the processing resource 544 to, responsive to a receipt of the action event, generate a second panel of the GUI. At block 554, the memory resource 542 may store instructions 550 which may be executed by the processing resource 544 to, responsive to a generation of the second panel, generate a second input source of the second panel of the GUI. At block 555, the memory resource 542 may store instructions 550 which may be executed by the processing resource 544 to assign a second index value to the first input source responsive to generating the second panel, wherein the first index value is not equal to the second index value and the second index value is a non-positive value.

In some examples, the memory resource 542 may store instructions 550 which may be executed by the processing resource 544 to prevent a screen reader associated with the computing system from providing an audio presentation of data describing the first input source that has been assigned the second index value, wherein the second index value can be a negative value. In some examples, the memory resource 542 may store instructions 550 which may be executed by the processing resource 544 to disable a subsequent action event corresponding to the first input source responsive to the first input source being assigned the second index value.

The second input source, on the other hand, can be assigned the first index value. The first index value can be a positive value. In some examples, the memory resource 542 may store instructions 550 which may be executed by the processing resource 544 to, responsive to traversing the first index value, provide, via a speech reader associated with the computing system, an audio presentation of data describing the second input source assigned the first index value.

Figure 6:
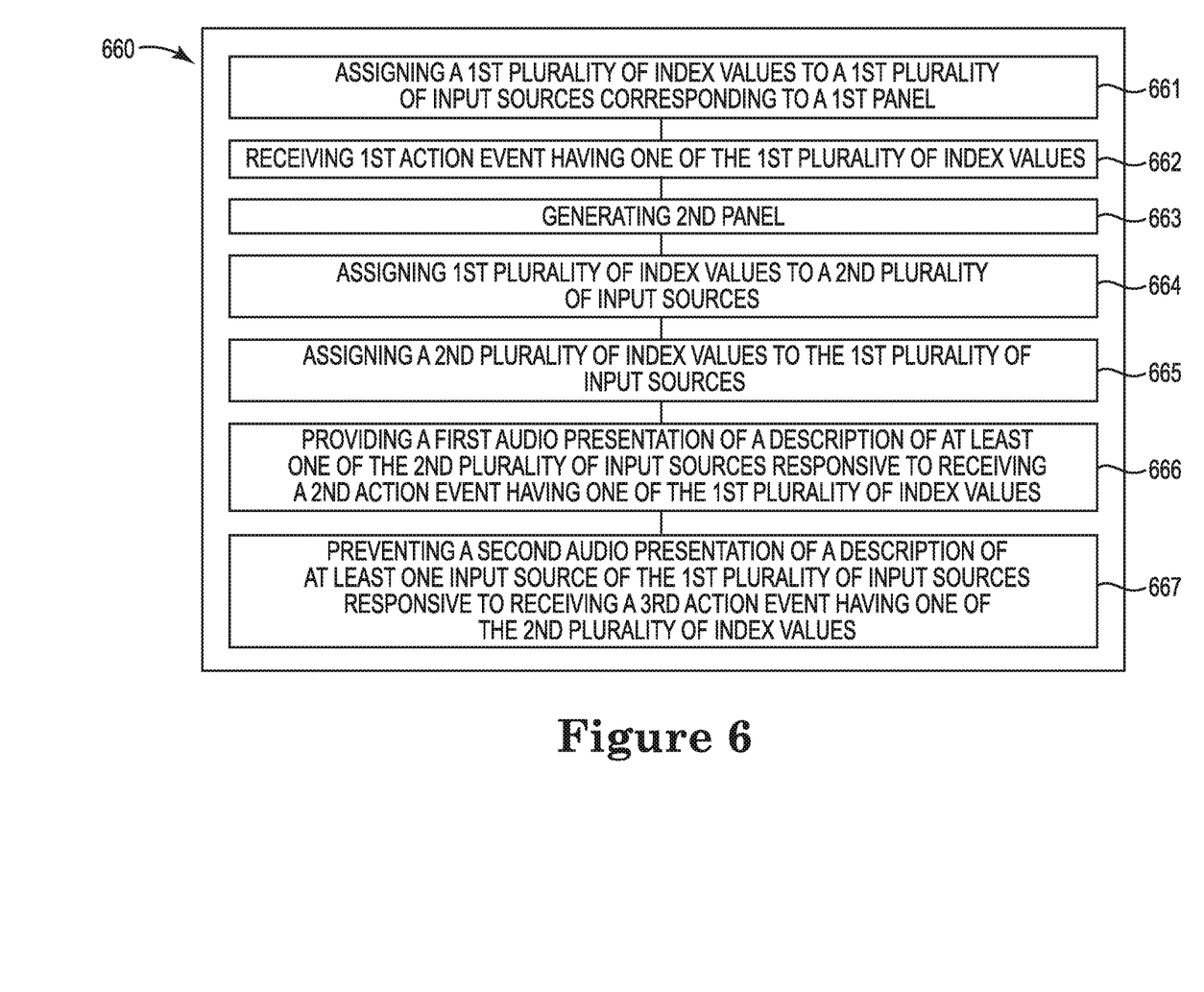
FIG. 6 illustrates an example flow diagram of a method to provide an audio presentation consistent with the disclosure.

FIG. 6 illustrates an example flow diagram of a method 660 to provide an audio presentation consistent with the disclosure. At block 661, the method includes assigning a first plurality of index values to a first plurality of input sources corresponding to a first panel of a GUI. At block 662, the method includes receiving a first action event having one of the first plurality of index values from one of the first plurality of input sources. At block 663, the method includes generating, responsive to receiving the first action event with one of the first plurality of index values, a second panel of the GUI. At block 664, the method includes assigning the first plurality of index values to a second plurality of input sources of the second panel. At block 665, the method includes assigning a second plurality of index values to the first plurality of input sources.

At block 666, the method includes providing a first audio presentation of a description of at least one of the second plurality of input sources responsive to receiving a second action event having one of the first plurality of index values. At block 667, the method includes preventing a second audio presentation of a description of at least one input source of the first plurality of input sources responsive to receiving a third action event having one of the second plurality of index values.

In some examples, a plurality of header input sources of the GUI may be assigned an index value comprising a zero value. Some examples can further comprise providing a third audio presentation of a description of at least one of the plurality of header input sources that is assigned the index value comprising the zero value after and/or before providing the second audio presentation of a description of the second plurality of input sources that are assigned the first index value. Alternatively, or in addition, some examples can comprise preventing a third audio presentation of a description of at least one of the plurality of header input sources that are assigned the index value comprising the zero value.

In some examples, the computing system can be a printing device.

In some examples, the first panel is displayed with a first amount of stipple that is different than a second amount of stipple used to display the second panel.

Figure 7:
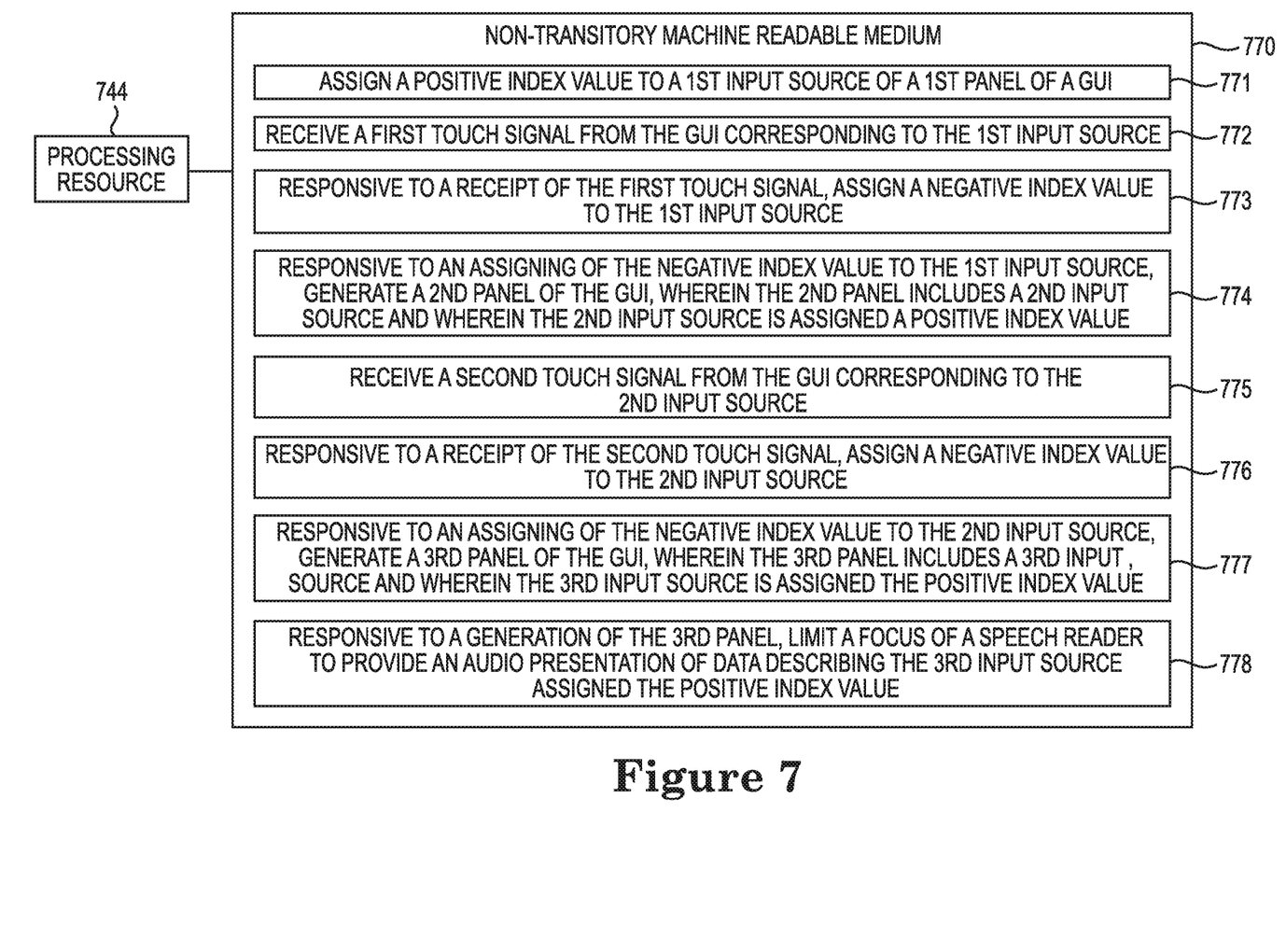
FIG. 7 illustrates an example non-transitory machine-readable medium to provide an audio presentation consistent with the disclosure.

FIG. 7 illustrates an example non-transitory machine-readable medium 770 to provide an audio presentation consistent with the disclosure. A processing resource 744 may execute instructions stored on the non-transitory machine readable medium 770. The non-transitory machine readable medium 770 may be any type of volatile or non-volatile memory or storage, such as random access memory (RAM), flash memory, read-only memory (ROM), storage volumes, a hard disk, or a combination thereof.

The example medium 770 stores instructions 771 executable by a processing resource 744 to assign a positive index value to a first input source of a first panel of a GUI. The example medium 770 can also store instructions 772 executable by a processing resource 744 to receive a first touch signal from the GUI corresponding to the first input source. The example medium 770 stores instructions 773 executable by a processing resource 744 to, responsive to a receipt of the first touch signal, assign a negative index value to the first input source.

The example medium 770 stores instructions 774 executable by a processing resource 744 to, responsive to an assigning of the negative index value to the first input source, generate a second panel of the GUI, wherein the second panel of the GUI includes a second input source and wherein the second input source is assigned a positive index value.

The example medium 770 stores instructions 775 executable by a processing resource 744 to receive a second touch signal from the GUI corresponding to the second input source. The example medium 770 stores instructions 777 executable by a processing resource 744 to, responsive to a receipt of the second touch signal, assign a negative index value to the second input source.

The example medium 770 stores instructions 777 executable by a processing resource 744 to, responsive to an assigning of the negative index value to the second input source, generate a third panel of the GUI, wherein the third panel of the GUI includes a third input source, and wherein the third input source is assigned the positive index value.

The example medium 770 stores instructions 778 executable by a processing resource 744 to, responsive to a generation of the third panel, limit a focus of a speech reader to provide an audio presentation of data describing the third input source assigned the positive index value.

In some examples, the third input source is within a dialog box of the third panel. In some examples, the example medium 770 stores instructions executable by a processing resource 744 to shift the focus of the speech reader to an input source corresponding to a receipt of a long press touch signal. In some examples, the example medium 770 stores instructions executable by a processing resource 744 to shift the focus of the speech reader to an input source corresponding to a receipt of a multi-touch signal.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A computing system comprising:
   a memory resource;
   a processing resource executing instructions stored in the memory resource to:
   display a first panel at a first location on a graphical user interface (GUI);
   assign a first index value to a first input source of the first panel of the GUI, wherein the first input source corresponds to a first setting associated with a printing device;
   receive an action event corresponding to the first input source;

responsive to a receipt of the action event to the first input source, generate a second panel of the GUI based on the first setting associated with the printing device;

display the second panel at a second location on the GUI;

responsive to a generation of the second panel, generate a second input source of the second panel of the GUI, wherein the second input source corresponds to a second setting associated with the printing device;

alter the first index value assigned to the first input source to a second index value in response to the action event to the first input source and generation of the second input source, wherein the second index value is less than the first index value; and assign a third index value to the second input source of the second panel, wherein the third index value is greater than the second index value;

receive an action event of the second input source;

generate a third panel in response to receiving the action event of the second input source;

generate a third input source based on the second setting of the printing device;

assign a fourth index value to the third input source that is greater than the third index value and greater than the second input value; and provide an audio presentation of a displayed presentation of:
 the first input source based on the second index value;
 the second input source based on the third index value; and
 the third input source based on the fourth index value, wherein an order of the audio presentation is defined by a quantitative value of the second index value, the third index value, and the fourth index value.

2. The computing system of claim 1, wherein the processing resource is to prevent a screen reader associated with the computing system from providing the audio presentation of data describing the first input source that has been assigned the second index value.

3. The computing system of claim 2, wherein the second index value is a negative value.

4. The computing system of claim 1, wherein the second setting further defines the first setting of a print job of the printing device and wherein the third setting further defines the second setting of the print job of the printing device.

5. The computing system of claim 1, wherein the processing resource is to disable a subsequent action event corresponding to the first input source responsive to the first input source being assigned the second index value.

6. The computing system of claim 1, wherein the second input source of the second panel is assigned a same value as the first index value.

7. The computing system of claim 6, wherein the processing resource is further to, responsive to traversing the first index value, provide, via a speech reader associated with the computing system, the audio presentation of data describing the second input source assigned the same value as the first index value.

8. The computing system of claim 1, wherein the first panel and the second panel are displayed simultaneously on the GUI.

9. A method to provide an audio presentation, comprising:
assigning a first plurality of index values to a first plurality of input sources corresponding to a first panel of a graphical user interface (GUI), wherein the first plurality of input sources correspond to settings associated with a printing device;

receiving a first action event corresponding to a first input source of the first plurality of input sources, wherein the first input source corresponds to a first setting associated with the printing device;

generating, responsive to receiving the first action event, a second panel of the GUI, wherein the second panel corresponds to a second setting based on the first setting associated with the printing device;

assigning the first plurality of index values to a second plurality of input sources of the second panel;

assigning a second plurality of index values to the first plurality of input sources, wherein the second plurality of index values are lower than the first plurality of index values;

assigning an index value comprising a zero value to a plurality of header input sources corresponding to a header of the GUI;

providing a first audio presentation of a description of the second plurality of input sources, wherein an order for the first audio presentation is defined by a positive quantitative value of the first plurality of index values assigned to the corresponding second plurality of input sources;

preventing a second audio presentation of a description of the first plurality of input sources when the second plurality of index values include a negative quantitative value; and providing a third audio presentation of a description of the plurality of header input sources that is assigned the index value comprising the zero value after providing the second audio presentation of a description of the second plurality of input sources that are assigned the first index value.

10. The method of claim 9, wherein the first panel is displayed with a first amount of stipple that is different than a second amount of stipple used to display the second panel.

11. A non-transitory machine readable medium storing instructions executable by a processing resource to:
assign a positive index value to a first input source of a first panel of a graphical user interface (GUI), wherein the first input source corresponds to a first setting of a printing device;

receive a first touch signal from the GUI corresponding to the first input source to select the first setting of the printing device;

responsive to a receipt of the first touch signal, assign a negative index value to the first input source;

responsive to an assigning of the negative index value to the first input source, generate a second panel of the GUI, wherein the second panel of the GUI includes a second input source and wherein the second input source is assigned a positive index value and corresponds to a second setting of the printing device related to the first setting of the printing device;

receive a second touch signal from the GUI corresponding to the second input source to select the second setting of the printing device;

responsive to a receipt of the second touch signal, assign a negative index value to the second input source;

responsive to an assigning of the negative index value to the second input source, generate a third panel of the GUI, wherein the third panel of the GUI includes a third input source, and wherein the third input source is assigned the positive index value and corresponds to a third setting of the printing device related to the second setting of the printing device;

responsive to a generation of the third panel, limit a focus of a speech reader to provide an audio presentation of data describing the third input source assigned the positive index value, wherein an order of the audio presentation is defined by a quantitative value of the positive index value assigned to the third input source.

12. The non-transitory machine readable medium of claim 11, wherein the third panel comprises a dialog box containing the third input source.

13. The non-transitory machine readable medium of claim 11, further comprising instructions executable to shift the focus of the speech reader to an input source corresponding to a receipt of a long press touch signal.

14. The non-transitory machine readable medium of claim 11, further comprising instructions executable to shift the focus of the speech reader to an input source corresponding to a receipt of a multi-touch signal.

* * * * *